Patented July 4, 1939

2,165,014

UNITED STATES PATENT OFFICE 2,165,014

ARTIFICIAL ZEOLITE AND METHOD OF PREPARING THE SAME

Milton J. Shoemaker, Madison, Wis., assignor, by mesne assignments, to Research Products Corporation, Madison, Wis., a corporation of Wisconsin No Drawing. Application September 30, 1936, Serial No. 103,410

7 Claims. (Cl. 23—113)

This invention relates to the art of making a water softening substance of the kind employing the base exchange reaction and known as zeolite. There are various kinds of zeolites, some of which occur naturally and others of which are produced artificially. This invention relates to the artificial product and more particularly to one which comprises a coprecipitated hydrated material comprising alkali metal, alumina and silica in the form of an alkali metal alumino-silicate.

Artificial zeolites are formed usually by mixing together in various ways and in varying proportions solutions of alkali metal silicate and alkali metal aluminate. A hydrated gel comprising alkali metal, alumina and silica is formed. The gel may be subjected to a freezing operation, as is described and claimed in Schorger United States Patent No. 1,949,360, granted February 27, 1934. The character of the gel varies with the concentration of the reacting solutions, but usually some mother liquor separates, with standing, and may be drained off. If desired, further quantities of mother liquor may be removed by washing with water. Lumps or granules of the zeolite gel remain, which may be dried, and if necessary, may be reduced to the desired size for water softening purposes. The resulting zeolite comprises hard granules of crystalline character, more or less resistant to the mechanical and chemical action which accompanies the handling and use to which they are normally subjected.

Zeolites of this character, however, ordinarily are dissolved to a slight extent by the water which is being passed over them. The rate of solution depends upon the character of the zeolite and of the water. Usually waters which are acid, that is, which have a pH value below 7, are more vigorous than others. Occasionally pH values as low as 5 are encountered in water supplies. Waters which contain free carbon dioxide are also corrosive, even though they may not have a pH value below 7.

It is an object of this invention to produce a zeolite having superior resistance to the dissolving effect of corrosive waters.

Another object of the invention is to provide a method by which increased resistance to such effect may be imparted to finished zeolites.

A further object is to provide a method for more or less permanently restoring the hardness, capacity and resistance to corrosion of used zeolites which have become deteriorated in these respects.

In a specific example of the application of my process, a gel is formed by mixing together water solutions of sodium silicate and sodium aluminate. The gel is then frozen as described in said Schorger Patent 1,949,360. After the freezing operation is complete, the gel is thawed and the mother liquor allowed to drain away. The result is a mass of moist zeolite granules which, although soft, have sufficient hardness and strength to be handled. These are soaked for about one hour by a water solution containing about 10% of sodium silicate having a 2.8 to 1 ratio of $SiO_2$ to $Na_2O$. One pound of the solution is used to about five pounds of the moist granules, the solution being circulated over a bed of the granules. After the soaking operation, the granules are drained and washed with water until the free alkali content has been reduced to about 0.1 percent. They are then subjected to an atmosphere at approximately 150° C. to fix the absorbed sodium silicate and to indurate and dry the granules. The granules become dry and free running when the moisture content is reduced to about 55% to 60%. When the moisture content is further reduced to about 40% to 50%, the sodium silicate becomes fixed in said granules and the latter becomes indurated. The heating should be stopped before the moisture content is reduced below about 30%. If the drying is carried beyond this point the base exchange capacity is impaired.

During the soaking period the granules absorb about 75% of the sodium silicate from the treating solution. In a commercial operation 48 pounds of treating solution containing 7.8% $SiO_2$ and 2.8% $Na_2O$ was used to treat 215 pounds of drained zeolite containing approximately 30% zeolite and 70% moisture. The spent treating solution weighed 48 pounds and contained 1.7% $SiO_2$ and 0.9% $Na_2O$. The zeolite absorbed about 4.5% of $SiO_2$ and about 1.5% of $Na_2O$ based on the weight of moisture-free zeolite.

The absorbed $SiO_2$ and $Na_2O$ is fixed in the granules and the granules are indurated substantially permanently and the properties of the zeolite are improved permanently, as will be described more fully. The granules possess materially increased resistance to the dissolving action of corrosive waters. They are of about the same hardness and density as the untreated granules, and they possess the property of retaining a slightly greater proportion of moisture, without being damp, than do the untreated granules.

The above is given as a specific example of a successful treatment, but the invention is not limited thereto. For example, instead of washing the granules after the treating operation, they may be dried before they are washed. In this modification the moist granules are treated with the sodium silicate solution, drained, and then subjected to an atmosphere of 150° C. to cause fixing, induration, and drying. After the moisture content has been reduced to about 30% to 50% the granules are washed with water until the free alkali content is reduced to about 0.1%. They are then allowed to drain until they are substantially free of surface moisture. The resulting material possesses somewhat greater acid resistance but somewhat less water softening capacity than the product of the first process described.

The fixing of the absorbed sodium silicate and the indurating of the treated granules may be accomplished by drying at room temperature (20° C.) instead of at 150° C. A current of air may be directed upon the treated material and the moisture content reduced until the granules are dry and hard. Drying at ordinary temperatures may be employed in both of the procedures described heretofore.

If desired, the zeolite may be given a double treatment with sodium silicate solution. In such case the drying step of the first treatment may be stopped after the moisture content has been reduced to about 65% and the second treatment is then applied. This may follow either of the two procedures outlined heretofore, so that the zeolite may be subjected to two similar treatments or to two dissimilar treatments. The second treatment imparts to the zeolite increased resistance to corrosive waters. The granules are hard and translucent and have the power to retain a greater proportion of moisture than do the untreated granules.

The alkali silicate treatment may be applied to the finished zeolite of the above mentioned Schorger patent. In this process the frozen zeolite is thawed, drained, washed with water and dried to about 30% to 50% moisture content. It is then treated with a 10% sodium silicate solution and the treated zeolite is drained. The subsequent drying and washing operations may be carried out in the manner described heretofore.

In carrying out the treatment of this present invention, the concentration of the sodium silicate solution may be varied. In general, the effectiveness of the treatment is increased as the concentration of the solution is increased. Solutions containing as little as 3% of sodium silicate have been used and found to have appreciable effect in increasing the resistance to corrosive waters. Solutions containing 6% have been found to have a greater effect. The concentration should not be increased to the point where the solution loses its free liquidity and becomes viscid, because under such conditions the process is hampered and the sodium silicate is not transferred readily to the granules. A 10% solution has been found to be suitable. The quantity of sodium silicate absorbed varies with the concentration of the sodium silicate solution.

The ratio of $SiO_2$ to $Na_2O$ may be varied. Ratios varying from 1.5 to 1 to 3.25 to 1 have been employed and have successfully improved the resistance to corrosive waters.

The quantity of sodium silicate solution used to treat a given quantity of zeolite may be varied over a wide range. It has been found that such variations do not greatly affect the result.

Materials other than sodium silicate may be used. Potassium silicate is suitable, and the stannates, tungstates, dichromates and molybdates of the alkali metals may be used.

I claim:

1. The method of preparing a base exchange zeolite which comprises forming a gel of a mixture of an alkali metal silicate with an alkali metal aluminate, freezing said gel, thawing said gel and removing mother liquor therefrom, treating the resulting moist granules with an alkali metal silicate and removing moisture from said granules to indurate the same.

2. The method of preparing a base exchange zeolite, which comprises forming a gel of a mixture of an alkali metal silicate with an alkali metal aluminate, freezing said gel, thawing said gel and removing mother liquor therefrom, treating the resulting moist granules with an alkali metal silicate, washing said granules and removing moisture from said granules to indurate the same.

3. The method of preparing a base exchange zeolite, which comprises forming a gel of a mixture of an alkali meal silicate with an alkali metal aluminate, freezing said gel, thawing said gel and removing mother liquor therefrom, soaking the resulting moist granules with a water solution containing sodium silicate, said sodium silicate having an $SiO_2$ to $Na_2O$ ratio of at least 1.50 to 1, washing and subjecting said granules to a heated atmosphere to indurate the same.

4. The method of preparing a base exchange zeolite, which comprises forming a gel of a mixture of an alkali metal silicate with an alkali metal aluminate, freezing said gel, thawing said gel and removing mother liquor therefrom to form moist granules, treating said moist granules with a water solution of a water soluble salt from the group consisting of the silicates, stannates, tungstates, dichromates and molybdates, of the alkali metals, and drying said granules to indurate the same.

5. The method of preparing a base exchange zeolite which comprises forming an aqueous alkali metal alumino-silicate gel, freezing said gel, thawing said gel and removing mother liquor therefrom to form moist granules, treating moist granules with an alkali metal silicate and removing moisture from said granules to indurate the same.

6. In the preparation of an alkali metal alumino-silicate zeolite, the method which comprises forming an aqueous gel of alkali metal alumino-silicate, freezing said gel, thawing said gel and removing mother liquor from said gel to form moist granules containing approximately 70% moisture, treating said moist granules with alkali metal silicate, and removing moisture from said granules to indurate the same.

7. The method of preparing a base exchange zeolite which comprises forming an aqueous alkali metal alumino-silicate gel, freezing said gel, thawing said gel and removing mother liquor therefrom to form moist granules, treating said granules with an alkali metal silicate solution, drying said granules to a moisture content of about 65%, treating said granules again with an alkali metal silicate solution, and drying said granules to indurate the same.

MILTON J. SHOEMAKER.